United States Patent
Kaneko et al.

(10) Patent No.: US 6,423,920 B1
(45) Date of Patent: Jul. 23, 2002

(54) ELECTRIC DISCHARGE MACHINING POWER SUPPLY, AND ELECTRIC DISCHARGE MACHINING METHOD

(75) Inventors: Yuji Kaneko, San Jose, CA (US); Daisuke Sadsmitsu; Zhanbo Gu, both of Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/762,062

(22) PCT Filed: Jun. 1, 2000

(86) PCT No.: PCT/JP00/03538

§ 371 (c)(1),
(2), (4) Date: Feb. 1, 2001

(87) PCT Pub. No.: WO00/73007

PCT Pub. Date: Dec. 7, 2000

(30) Foreign Application Priority Data

Jun. 1, 1999 (JP) .......................... 11-154142

(51) Int. Cl.[7] .................................. B23H 1/02
(52) U.S. Cl. ...................... 219/69.18; 219/69.13
(58) Field of Search ................... 219/69.13, 69.18, 219/69.17; 323/272; 205/646; 204/224 M

(56) References Cited

U.S. PATENT DOCUMENTS 4,864,092 A 9/1989 Obara ................ 219/69.18
5,019,685 A * 5/1991 Nishimura ............... 219/69.13
6,130,395 A * 10/2000 Kaneko et al. .......... 219/69.18

FOREIGN PATENT DOCUMENTS

| JP | 5-8121 A | * 1/1993 | ............. 219/69.13 |
| JP | 6-79532 | 3/1994 | |
| JP | 6-312316 | 11/1994 | |

* cited by examiner

Primary Examiner—Geoffrey S. Evans
(74) Attorney, Agent, or Firm—McDermott, Will & Emery; Paul Devinsky

(57) ABSTRACT

A power supply (100) and a method for electric discharge machining by repeatedly providing a current pulse to a working gap (3) formed between a tool electrode (1) and a workpiece (2) includes a d.c. power source (E), first switching elements (Tr1–Trn) connected between the d.c. power source and the working gap, capacitors (C1–C8) connected in parallel with the working gap, second switching elements (67) for controlling current flow from the capacitor to the working gap, a detector (50) for detecting start of an electric discharge, and a controller (20) for controlling the first switching elements and the second switching elements in response to the detector. Current is supplied from the d.c. power source through the first switching elements to the working gap only for a first time interval ($\tau$ ON) starting from the commencement of electric discharge, and a current is supplied from the capacitor through the second switching elements to the working gap for only a second time interval (T) is shorter than the first time interval, starting from the commencement of an electric discharge.

6 Claims, 4 Drawing Sheets

ELECTRIC DISCHARGE MACHINING POWER SUPPLY, AND ELECTRIC DISCHARGE MACHINING METHOD

TECHNICAL FIELD

The present invention relates to an electric discharge machine for machining a workpiece by generating electric discharge in a working gap formed between a tool electrode and the workpiece. More particularly, the invention particularly relates to an electric discharge machine power supply and method for repeatedly applying current pulses to the working gap using a capacitor.

BACKGROUND OF THE INVENTION

When power is applied from a d.c. power source to the working gap, which is a microscopic gap formed between a tool electrode of an electric discharge machine and a conductive workpiece, the resistance of dielectric fluid in the gap is reduced. As the insulation characteristics of the dielectric fluid break down, an electric discharge occurs and the so-called pulse ON-time commences. During the controlled ON-time, electric discharge machining current flows through the working gap. As a result, workpiece material is evaporated or melted. Upon completion of the ON time, application of power is suspended during a controlled OFF-time, during which the insulation properties of the dielectric fluid is restored. In this way, current pulses having a controlled ON-time and a controlled OFF-time are repeatedly supplied to the working gap. A steep rising edge of the current pulses waveform is known to contribute to improved machining speed.

FIG. 4 is a circuit diagram illustrating an electric discharge machine power supply according to the related art. A workpiece 2 is arranged in a work tank (not illustrated) filled with dielectric fluid such as kerosene. A tool electrode 1 is positioned so that a working gap 3 of microscopic size is formed between the tool electrode and the workpiece 2. N series combinations made up of switching transistors Tr1–Trn and current limiting resistors R1–Rn are connected in parallel between a d.c. power source E and the working gap 3. In order to simplify the drawing, only two series combinations are shown, the other series combinations have been omitted from the drawing for clarity. An on/off switching operation of the switching transistors Tr1 to Tr2 is controlled by a gate pulse signal GP.

Electronic components such as a unit for generating the gateway signal GP, a d.c. power supply E, switching transistors Tr1–Trn, and current limiting resistors R1–Rn are normally housed in a cabinet. This type of cabinet is invariably arranged at a physical distance from mechanical sections such as a member for supporting the workpiece and a member for providing relative allowing movement between the tool electrode and workpiece. In order to electrically connect the d.c. power source E and the working gap 3, a suitable conductor such as a coaxial cable CC is provided between the cabinet and the mechanical sections.

The power supply of FIG. 4 further includes a capacitor C connected in parallel across the working gap 3. A switch SW is connected between the capacitor C and the working gap 3, and it is possible to selectively use the capacitor C. The electrostatic capacity of the capacitor can be set in a range of, for example 0.0068–1.6 $\mu$F. The combination of the capacitor C and the switch SW is arranged as close as possible to the working gap 3. The capacitor C and switch SW are housed, for example, in a small box attached to a side wall of the work tank. If at least one of the switching transistors Tr1–Trn is turned on with the switch SW in the closed state, the capacitor C starts to charge. When the charging voltage of the capacitor C exceeds a certain value, an electric discharge current I flows through the work gap 3. At the same time as current is supplied from the capacitor C to the work gap 3, current is also supplied from the d.c. source E through the switching transistor to the working gap 3. A current pulse waveform supplied from the capacitor C to the working gap 3 is characterized by a steep rising edge. This steep rising edge improves the machining rate. The circuit of FIG. 4 is particularly useful in cases such as where a copper electrode is used so that the surface of a steel workpiece may be finished with a surface roughness of 3 $\mu$mRy or less, or where a copper tungsten electrode is used when machining a sintered hard metal workpiece.

The time taken for an electric discharge to commence after the switching transistors are turned on varies depending on the condition of the working gap 3. As a result, there is the drawback that current supplied from the capacitor C to the working gap is not constant. For example, an electric discharge may commence in the working gap before there has been sufficient charging of the capacitator. Also, even if the switching transistors Tr1–Trn are off, it is possible for an unexpected discharge to occur in the working gap 3 because of electric charge stored in the capacitor C.

SUMMARY OF THE INVENTION

An object of the present invention is to provide an electric discharge machine power supply that can control a single charge of current pulse energy supplied from a capacitor to a working gap so as to be essentially constant.

Another object of the present invention is to provide an electric discharge machine power supply and method that can sufficiently ensure sufficient time to enable capacitor charge to be stored. Additional objects of the invention will be set forth in the description which follows, and will in part become apparent to those skilled in the art upon practicing the invention.

In order to achieve the above and other objects, one aspect of present invention is directed to an electric discharge machine power supply and method which repeatedly provides a current pulse to a working gap formed between a tool electrode and a workpiece, the power supply comprising a d.c. power source, first switching elements connected between the d.c. power source and the working gap, a capacitor connected in parallel with the working gap, second switching elements for controlling current flow from the capacitor to the working gap, a detector for detecting the start of an electric discharge, and a controller for controlling the first switching elements and the second switching elements in response to the detector so that current is supplied from the d.c. power source through the first switching elements to the working gap only for a first time interval from commencement of electric discharge, and current is supplied from the capacitor through the second switching elements to the working gap for only a second time interval, shorter than the first time interval, starting from commencement of an electric discharge.

According to another aspect of the present invention, there is provided an electric discharge machining power supply by repeatedly providing a current pulse to a work gap formed between a tool electrode and a workpiece; the power supply, comprising a d.c. power source, first switching elements connected between the d.c. power source and the working gap, a first cable for directing current from the d.c. power source through the first switching elements to the working gap, a capacitor connected in parallel with the working gap, a second cable for directing charging current from the d.c. power source to the capacitor, second switching elements for controlling charge current flowing from the capacitor to the working gap, and a controller for controlling the first switching elements and the second switching elements.

PREFERRED EMBODIMENTS OF THE INVENTION

Figure 1:
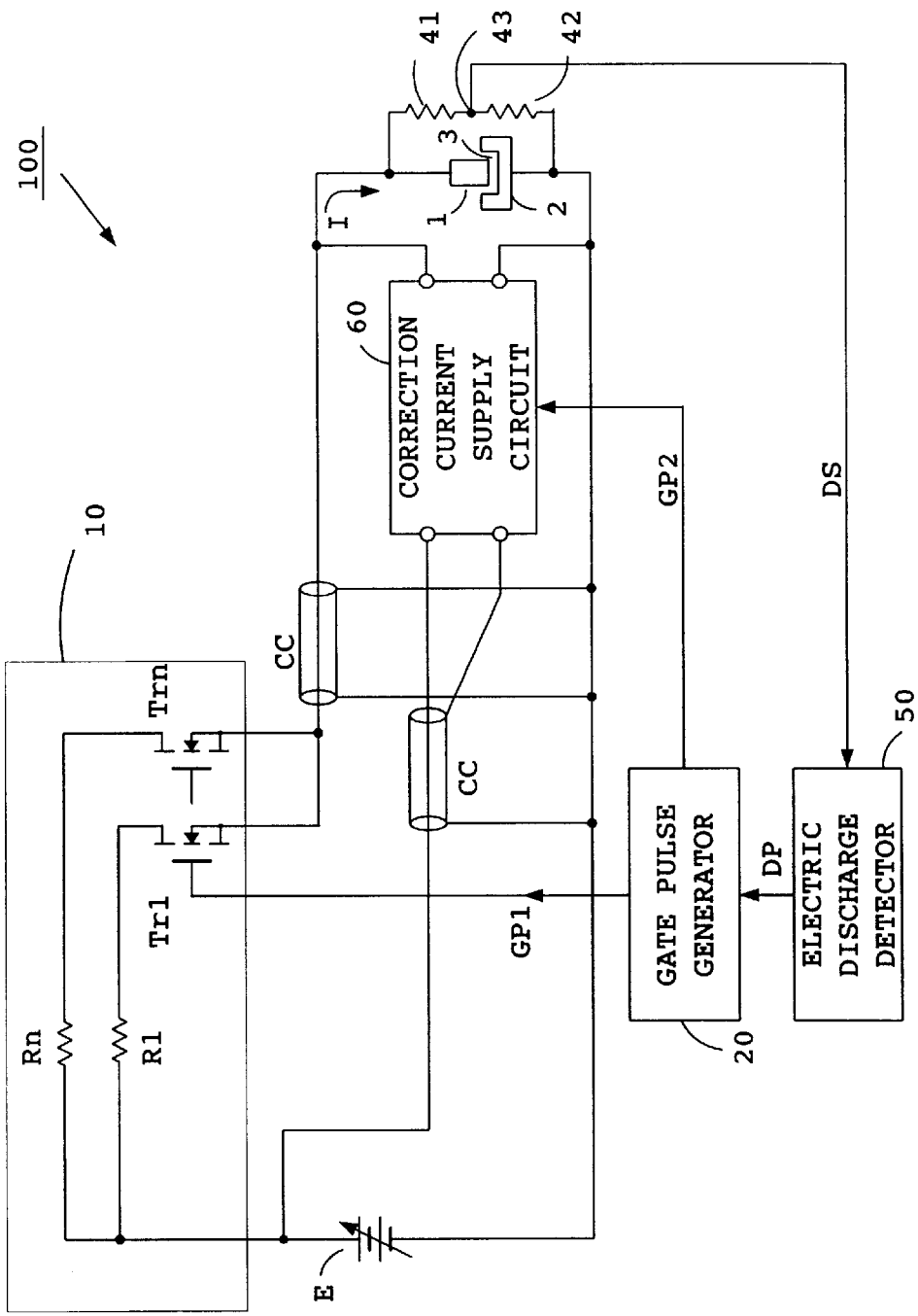
FIG. 1 is a circuit diagram illustrating an electric discharge machining power supply of the present invention.

An electric discharge machine power supply according to a preferred embodiment of the present invention will now be described with reference to FIG. 1 and FIG. 2. Reference numerals that are the same as those used in FIG. 4 represent the same structural elements, and further description of these elements will be omitted.

Figure 4:
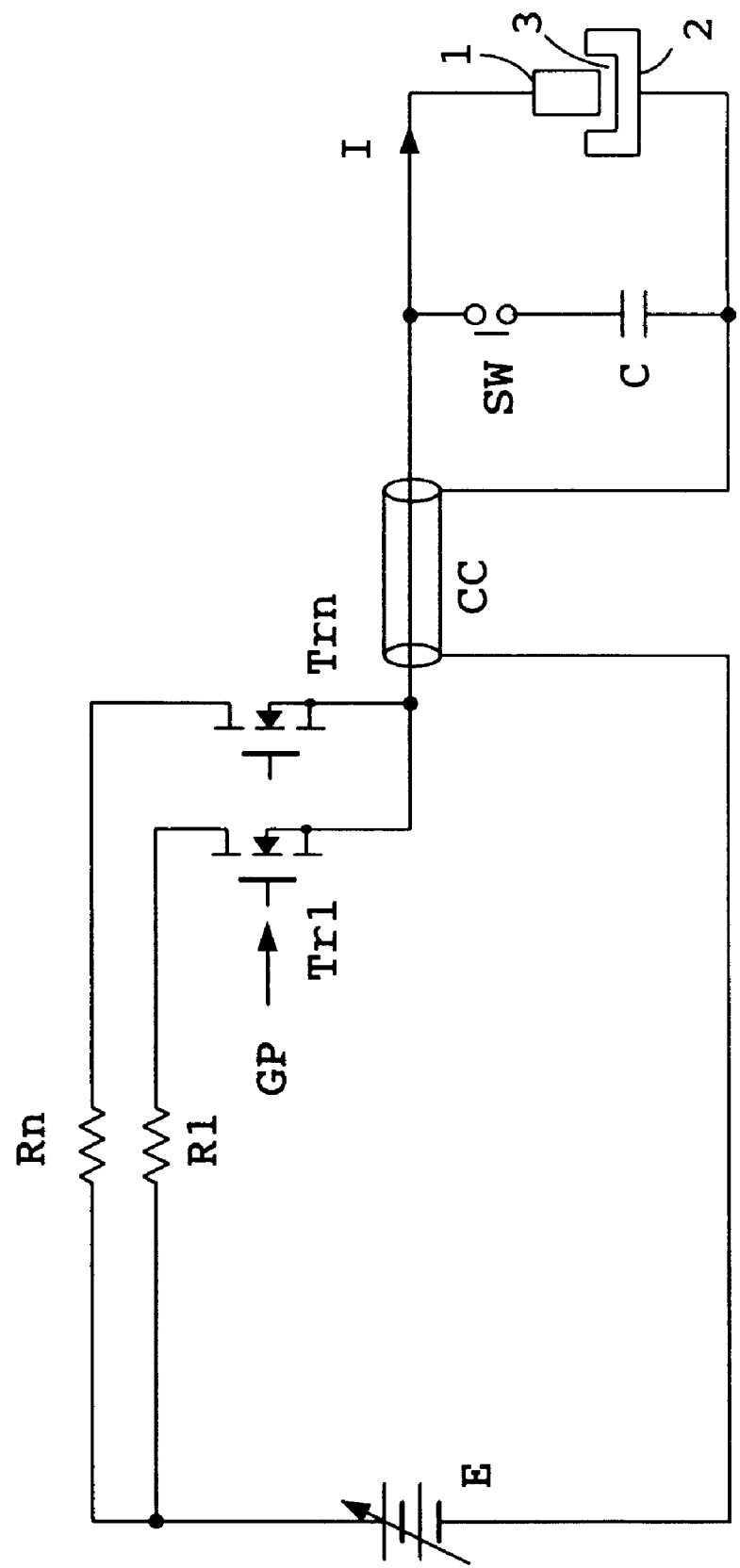
FIG. 4 is a circuit diagram illustrating an electric discharge machining power supply according the related art.

An electric discharge machine power supply 100, similar to the power supply of FIG. 4, comprises a d.c. power source E, and a switching circuit 10 made up of n current limiting resistors R1–Rn and switching transistors Tr1–Trn. A series combination of resistors 41 and 42 for detecting a voltage being applied across a working gap 3 is connected in parallel across the working gap 3. A signal DS, representing a voltage detected at a connection point 43 between the resistors 41 and 42, is supplied to an electric discharge detector 50. The electric discharge detector 50 compares the voltage signal DS with a reference voltage, and if it is determined that an electric discharge has started at the gap 3, an impulse signal DP is supplied to a gate pulse generator 20. A correction current supply circuit 60, for increasing the steepness of a rising edge of a waveform of an electric discharge current I that has been turned into pulse, is provided in the vicinity of the working gap 3.

Figure 2:
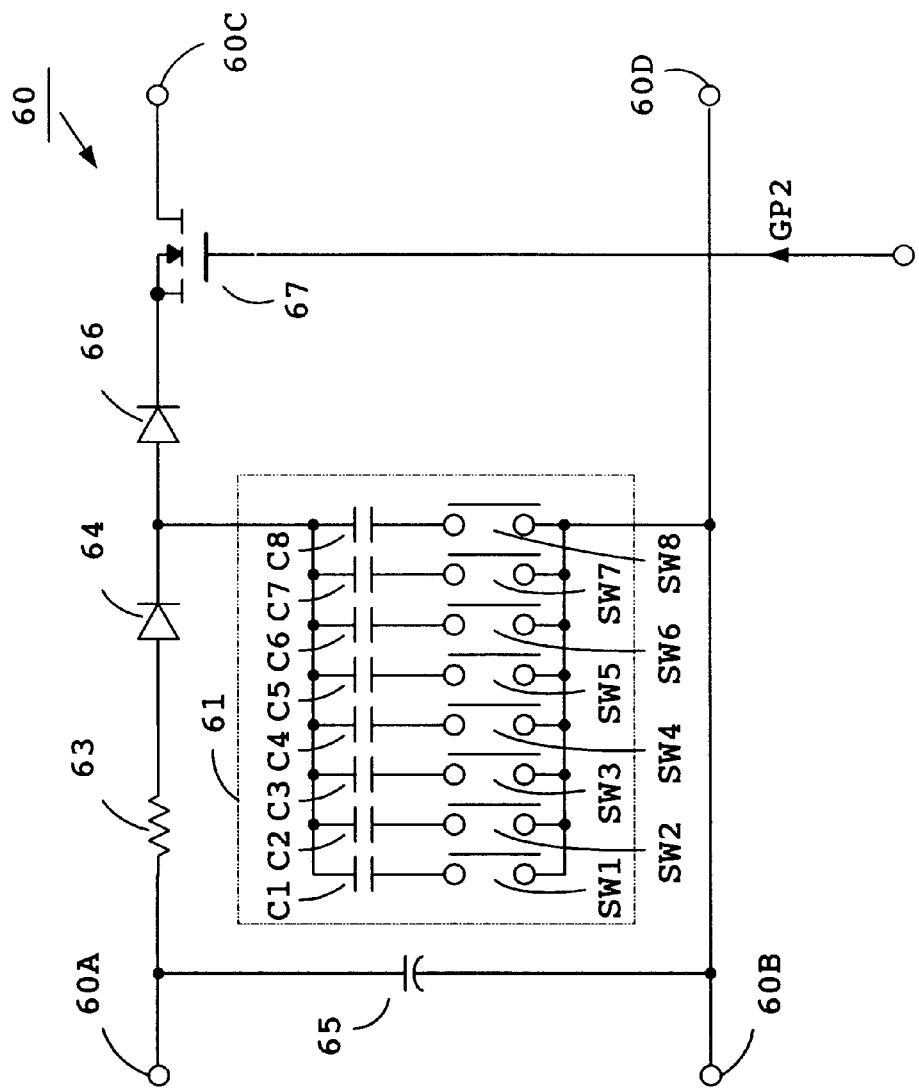
FIG. 2 is a circuit diagram illustrating a correction current supply circuit of FIG. 1.

As shown in FIG. 2, the correction current supply circuit 60 comprises a capacitor circuit 61 made up of a plurality of capacitors C1–C8 charged by the d.c. power source E, and switches SW1–SW8 connected to these capacitors. The electrostatic capacitance of the capacitor circuit 61 may be set in the range of, for example, 0.0068–1.6 $\mu$F. using the switches SW1–SW8. Charging terminals 60A and 60B of the correction current supply circuit 60 are connected to the d.c. power source E by a low inductance coaxial cable CC, while output terminals 60C and 60D are connected to the working gap 3. Charging current is supplied from the d.c. power source E through the current limiting resistor 63 and a diode 64 to the capacitor circuit 61. Charging time is fixed by a time constant RC. For example, when assuming a 15Ω resistor R63 is used and a 1.6 $\mu$F. capacitor is selected in the capacitor circuit 61, the charging time is about 24 $\mu$s. Reference numeral 65 represents an accelerating capacitor. If electric discharge starts at the working gap 3, current flows from the capacitor circuit 61, through the diode 66 and the switching transistor 67 to the working gap 3. In order to prevent this current from being undesirably affected by inductance, the capacitor circuit 61 is arranged as close as possible to the working gap 3. The on/off switching operation of the switching transistor 67 is controlled by a gate pulse signal GP2 supplied from the gate pulse generator 20.

Operation of the exemplary electric discharge machine power supply 100 will now be described with reference to FIG. 3A, FIG. 3B, FIG. 3C, FIG. 3D and FIG. 3E.

Figure 3:
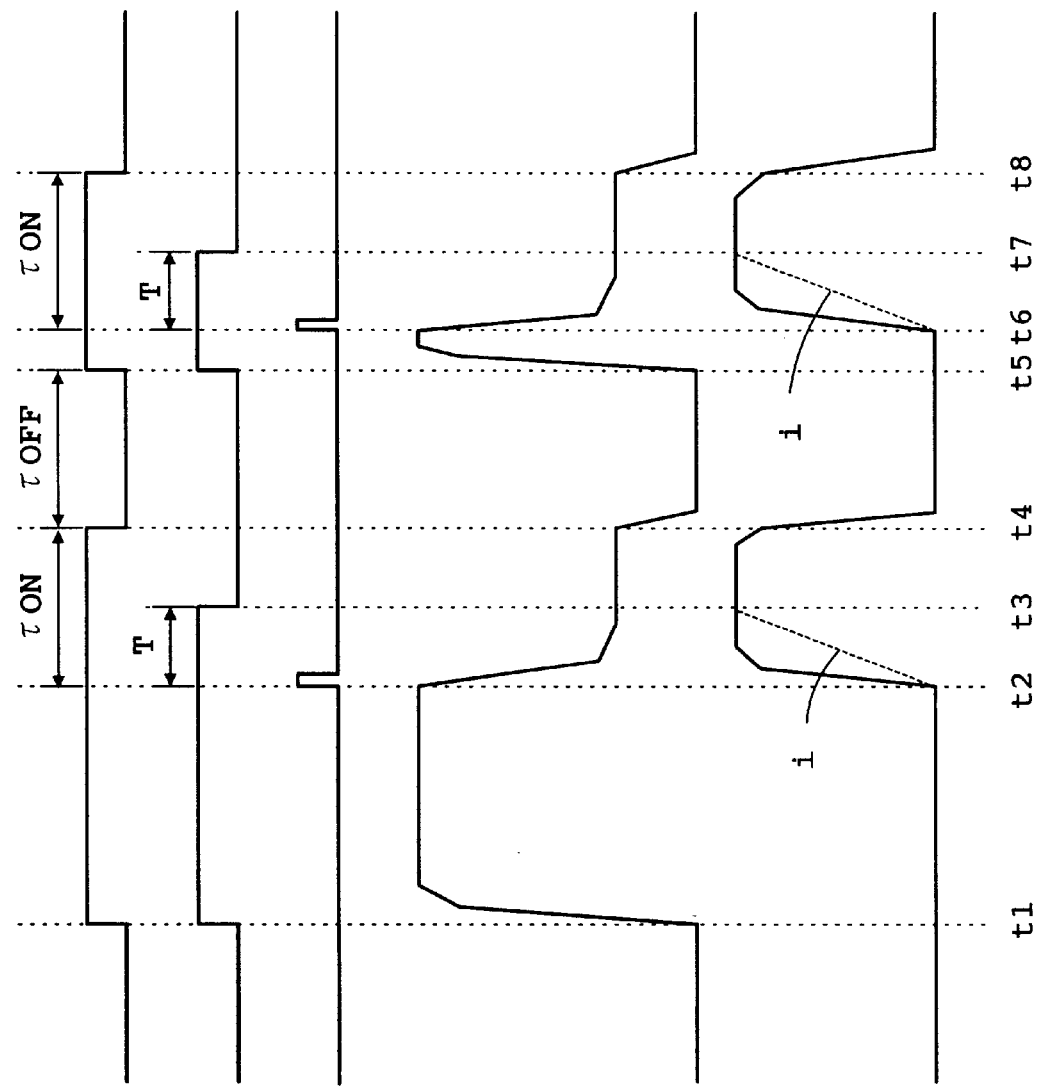
FIG. 3A, FIG. 3B, FIG. 3C, FIG. 3D, and FIG. 3E are timing charts illustrating operation of the electric discharge machining power supply of FIG. 1.

As shown in FIG. 3A, at time t1 when the gate pulse signal GP1 goes to a high or "H" level, voltage is applied across the working gap 3 from the d.c. power source E, as shown in FIG. 3D. As shown in 3B, at time t1 the gate pulse signal GP2 also goes to an "H" level. At time t2 when electric discharge starts at the working gap 3, current I flows through the working gap 3, as shown in FIG. 3E and FIG. 3D, the voltage DS falls. The electric discharge detector 50 detects this voltage drop, and as shown in FIG. 3C, supplies a signal DP representing start of electric discharge to the gate pulse generator 20. The gate pulse generator 20 keeps the gate pulse signal GP1 at an "H" level from time t2 until time t4 when the set ON time $\tau$ ON expires. During the time $\tau$ ON, current i flows from the d.c. power source E through the switching circuit 10 to the working gap 3, but, as shown in FIG. 3B, this current i rises comparatively slowly because of the current limiting resistors in the switching circuit 10. In order to increase the relatively slow rising edge of current i, the gate pulse generator 20 keeps the gate pulse signal GP2 at an "H" level from time t2 until time t3 when a set time interval T expires. During time interval T, current flowing from the capacitor circuit 61 through the switching transistor 67 to the working gap 3 is combined with the current i, producing a steeper rising edge in the waveform of current I. The time interval T is preferably set to such a value that current i reaches a peak value, in, for example, 5$\mu$s, and is shorter than the time interval $\tau$ ON. Since the time interval T is set in the gate pulse generator 20, energy provided from the capacitor circuit 61 to the working gap 3 is constant during time interval $\tau$ ON. The gate pulse generator 20 maintains the gate pulse signal GP1 at an "L" level from time t4 until time t5 when set time interval $\tau$ OFF elapses. from time t6, when an electric discharge starts again, until time t7 when the time interval T elapses, current from the capacitor circuit 61 flows to the working gap 3. From time t6 until time t8, when the time interval ON elapses, current I flows through the working gap 3. In this way, the gate pulse generator 20 controls the switching transistors Tr1–Trn and 67 so that the time interval $\tau$ ON, during which the workpiece 2 is machined by pulse current I, and the time interval $\tau$ OFF during which the insulating characteristics of the dielectric fluid in the work gap 3 are restored, are constant. From time t3 until time t5 the gate pulse generator 20 keeps the gate pulse signal GP2 at an "L" level, which means that flow of current from the capacitor circuit 61 to the work gap 3 is prevented during the time interval $\tau$ OFF. The capacitor circuit 61 is charged from time t1–time t3, and ensures a longer charging time as compared with the capacitor C of FIG. 4.

It is not intended that the present invention be limited by the precise forms disclosed, and obviously many modifications and variations are possible in light of the above teaching. For example, the capacitor circuit 61 may be is charged using the d.c. power source E, but it is also possible for a separate d.c. power source to charge the capacitor circuit 61. The illustrated embodiment was chosen and described in order to best explain the principles of the invention and its practical application. It is intended that the scope of the invention be defined by the claims appended hereto.

Translation for the drawings

FIG. 1

20 gate pulse generator
50 electric discharge detector
60 correction current supply circuit

What is claimed is:

1. A power supply for repeatedly providing a current pulse to a working gap formed between a tool electrode and a workpiece, comprising:

a d.c. power source;

a first switching element connected between the d.c. power source and the working gap;

a capacitor connected in parallel with the working gap;

a second switching element for controlling current flow from the capacitor to the working gap;

a detector for detecting start of an electric discharge; and a controller for controlling the first switching element and the second switching element in response to the detector wherein current is supplied from the d.c. power source through the first switching element to the working gap for a first time interval from commencement of an electric discharge, and current is supplied from the capacitor through the second switching element to the working gap for a second time interval, shorter than the first time interval, starting from commencement of the electric discharge.

2. The power supply according to claim 1, wherein the capacitor and the second switching element are arranged in the vicinity of the working gap.

3. The power supply according to claim 1, wherein the capacitor is charged by the d.c. power source.

4. The power supply according to claim 1, wherein a current limiting resistor is connected in series with the first switching element.

5. A power supply for repeatedly providing a current pulse to a working gap formed between a tool electrode and a workpiece, comprising:

a d.c. power source;

a first switching element connected between the d.c. power source and the working gap;

a first cable for directing current from the d.c. power source, through the first switching element, to the working gap;

a capacitor connected in parallel with the working gap;

a second cable for directing a charging current from the d.c. power source to the capacitor;

a second switching element for controlling charge current flowing from the capacitor to the working gap; and a controller for controlling the first switching element and the second switching element.

6. A method for machining a workpiece by repeatedly causing electric discharges at a working gap formed between a tool electrode and the workpiece, comprising the steps of:

applying a voltage across the working gap;

detecting the start of an electric discharge at the working gap;

supplying current from a d.c. power source through a current limiting resistor to the working gap for a first time interval commencing with the start of an electric discharge; and supplying current from a capacitor to the working gap for a second time interval, shorter than the first time interval, commencing from the start of an electric discharge.

\* \* \* \* \*